United States Patent
Hogg et al.

(10) Patent No.: US 7,564,035 B2
(45) Date of Patent: Jul. 21, 2009

(54) GENERATING DETECTOR EFFICIENCY ESTIMATES FOR A PET SCANNER

(75) Inventors: Darren Hogg, Murrumbeena (AU); Kris Filip Johan Jules Thielemans, London (GB)

(73) Assignee: Hammersmith Imanet Limited, London (GB)

(*) Notice: Subject to any disclaimer, the term of this patent is extended or adjusted under 35 U.S.C. 154(b) by 0 days.

(21) Appl. No.: 10/559,145

(22) PCT Filed: Jun. 3, 2004

(86) PCT No.: PCT/GB2004/002340

§ 371 (c)(1),
(2), (4) Date: May 5, 2006

(87) PCT Pub. No.: WO2004/109332

PCT Pub. Date: Dec. 16, 2004

(65) Prior Publication Data

US 2006/0249682 A1    Nov. 9, 2006

(30) Foreign Application Priority Data

Jun. 4, 2003  (GB) ................. 0312776.8

(51) Int. Cl.
*G01T 1/164* (2006.01)
(52) U.S. Cl. ............... 250/363.03; 250/363.04; 250/363.07; 250/363.09
(58) Field of Classification Search ........... 250/363.03, 250/363.04, 363.07, 363.09
See application file for complete search history.

(56) References Cited

U.S. PATENT DOCUMENTS

| | | | |
|---|---|---|---|
| 4,882,494 A | 11/1989 | Rogers et al. | |
| 5,677,536 A | 10/1997 | Vickers | |
| 6,008,493 A * | 12/1999 | Shao et al. | 250/363.04 |
| 6,040,580 A * | 3/2000 | Watson et al. | 250/363.03 |
| 6,100,531 A * | 8/2000 | Hines et al. | 250/363.04 |
| 6,198,104 B1 * | 3/2001 | Geagan et al. | 250/363.04 |
| 6,201,247 B1 * | 3/2001 | Lutheran et al. | 250/363.04 |
| 6,232,604 B1 * | 5/2001 | McDaniel et al. | 250/363.03 |
| 6,271,517 B1 | 8/2001 | Kroening | |
| 6,376,841 B1 * | 4/2002 | Petrillo et al. | 250/363.03 |

OTHER PUBLICATIONS

Bailey et al., Strategies for accurate attenuation correction with single photon transmission measurements in 3D Pet, 1998, IEEE, pp. 1009-1013.*
Spinks, T.J., et al., "Physical Characteristics of the ECAT EXACT3D Positron Tomograph" Phys. Med. Biol., vol. 45, 2000, pp. 2601-2618.

(Continued)

*Primary Examiner*—David P Porta
*Assistant Examiner*—Djura Malevic
(74) *Attorney, Agent, or Firm*—Robert F. Chisholm

(57) ABSTRACT

Detector efficiency data is generated for a positron emission tomography scanner (2) including a single photon source by conducting a blank scan acquisition procedure using the single photon source. The acquired detection count data is processed using an efficiency estimation algorithm to calculate data efficiencies of individual detectors in the detector array (8). In one embodiment, the detection count data is output as artificial coincidence count data and the efficiency estimation algorithm operates on the artificial coincidence count data. The method can be used in a non-rotating scanner or a rotating scanner.

19 Claims, 6 Drawing Sheets

OTHER PUBLICATIONS

Bailey, D.L., et al. "An Investigation of Factors Affecting Detector and Geometric Correction in Normalization of 3-D PET data" IEEE Transactions on Nuclear Science, vol. 43, No. 6, 1996, pp. 3300-3307.

Watson, C.C., et.al., "Design and Performance of a Single Photon Transmission Measurement for the ECAT ART" Nuclear Science Symposium, 1997, IEEE Alburquerque, NM, USA Nov. 9-15, 1997, New York NY, USA, IEEE, US, Nov. 9, 1997, pp. 1366-1370.

Badawai, R.D., et.al., "Algorithms for Calculating Detector Efficiency Normalization Coefficients for True Coincidences in 3D PET" Phys. Med. Biol., vol. 43, 1998, pp. 189-205.

Hogg, et.al., "Maximum-Likelihood Estimationof NormalisationFactors for PET" IEEE Nuclear Science Symposium and Medical Imaging conference Record published 2002, pp. 2065-2069.

PCT/GB2004/002340 International Search Report dated Oct. 2004.

PCT/GB2004/002340 International Preliminary Report on Patentability dated Jun. 2005.

GB0312776.8 dated Nov. 2003.

* cited by examiner

GENERATING DETECTOR EFFICIENCY ESTIMATES FOR A PET SCANNER

This application is a filing under 35 U.S.C. 371 of international application number PCT/GB2004/002340, filed Jun. 3, 2004, which claims priority to application number 0312776.8 filed Jun. 4, 2003, in Great Britain the entire disclosure of which is hereby incorporated by reference.

FIELD OF THE INVENTION

This invention relates to a method of, and computer software for, generating detector efficiency estimates for a positron emission tomography (PET) scanner including a detector array for generating detection data and a single photon source.

BACKGROUND OF THE INVENTION

There are various different types of acquisition procedure in PET, including an emission scan, a transmission scan and a blank scan.

A typical emission scan begins with the injection of a solution including a tracer, which is a pharmaceutical compound including a radio-isotope with a short half-life, into the subject. The subject may be human or animal. The tracer moves to, and is typically taken up, in one or more organs in the subject according to biological and biochemical processes which occur within the subject. When the radio-isotope decays, it emits a positron, which travels a short distance before annihilating with an electron. This annihilation produces two high energy photons propagating in opposite directions. The PET scanner includes a photon detector array arranged (usually in a ring-shaped pattern) around the scanning area. If two photons are detected within a short timing window, a so-called "coincidence" is recorded along a line of response (LOR) connecting the two detectors. Coincidence counts along each LOR are incremented in a data storage part referred to as a sinogram bin each time a coincidence is detected between the corresponding detector pair. The output coincidence count data from each sinogram bin is typically processed using tracer uptake models and image processing techniques to obtain volumetric medical images and volumetric tracer uptake rate data for the subject.

It would be desirable to be able to ascertain detector efficiencies in order to be able to detect deterioration in the state of operation of detectors in the detector array, since upon deterioration of a detector, the scan results are accordingly reduced in accuracy, leading to poor image quality.

For quantitative results from PET images, attenuation correction forms one of the most crucial data correction stages. In a conventional PET scanner, the scanner is provided with one or more positron emitter rod sources, formed of a material such as $^{68}$Ge, which emit dual annihilation photons. To derive attenuation factors, two acquisitions using the rod sources are conventionally used—a blank scan, in which the subject being scanned is not present in the scanning area (typically, the scanner is empty except for the presence of the sources) and a transmission scan in which the subject is present in the scanning area. Since the source material is a positron emitter, the two photons arising from the annihilation of a positron and an electron are acquired in coincidence, in the same manner as with an emission scan. Conventionally, the results of the blank scan are then divided by the results of the transmission scan to derive an attenuation sinogram. The attenuation sinogram is then used to correct the emission scan for attenuation, although extra processing steps on blank scan data and transmission scan data are sometimes used.

Also, by collecting the coincidence count data during a blank scan and processing the count data using an efficiency estimation algorithm, individual detector efficiencies can be estimated. For non-rotating PET scanners, estimates of the detector efficiency may be calculated by adding together the counts detected between a particular detector and all the detectors that are in coincidence with it. This is known as a fansum and it is based on the following measurement model:

$$M_{ij} = \epsilon_i \epsilon_j A_{ij} \quad (1)$$

where $M_{ij}$ are the measured coincidence counts between detectors i and j, $\epsilon_i$ and $\epsilon_j$ are the intrinsic efficiencies of detectors i and j respectively and $A_{ij}$ are the ideal coincidence counts measured if the detectors had an ideal performance. Thus the measured counts $M_{ij}$ of a particular coincident pair of detectors are proportional to the product of the individual detector efficiencies. An estimate of each individual detector efficiency $\epsilon_i$ is made by summing the measured coincidence counts $M_{ij}$ over all detectors j in coincidence with detector i:

$$\varepsilon_i = \sum_j M_{ij} \quad (2)$$

The above equation is based on the assumption that:

$$\sum_j \varepsilon_j A_{ij} = \text{constant} \quad (3)$$

The assumption is reasonable providing that the efficiencies are not significantly different, that $$\sum_j$$

$A_{ij}$ is roughly independent of i and that the number of coincident detectors is sufficiently large. More accurate methods have been proposed which take into account noise and other variables. Further examples of efficiency estimation algorithms for calculating detector efficiencies in conventional PET scanners are described in "Maximum-Likelihood Estimation of Normalisation Factors for PET", D. Hogg, K. Thielemans, T. Spinks and N. Spyrou, Nuclear Science Symposium and Medical Imaging Conference Record, IEEE, 2001.

In an alternative PET scanner arrangement, used for example in the ECAT EXACT3D™ PET scanner, a single photon source is provided for the transmission scan. In this scanner the source, a $^{137}$Cs pellet, is automatically moved by a transport mechanism having a spiral tube that is placed in front of the detectors when a transmission scan takes place. By forcing a liquid through the tube the source is moved at a constant speed through the scanner in a helical motion to provide a full 3D transmission scan.

As it uses a single photon source however, there is no second photon generated during an annihilation with which to form a coincident pair. With no coincident pair, no real coincidence counts are available from which a transmission sinogram could be created. The way this problem is solved is that the scanner in this mode measures only the detections furthest from the source, ignoring those registered in detectors close to the source, while tracking the position of the source. The source position is measured at four equidistant points about the helix. Since the speed of movement of the source is effectively uniform, its position can be calculated accurately to within one detector position over the entire length of the helix. From the position of the detector and the source, an artificial coincidence count is generated. The set of artificial coincidence counts detected during a transmission scan are collected and a transmission sinogram is calculated. However, detector efficiency estimates are not obtained from these results.

Some PET scanners have detector arrangements which rotate during an acquisition. Typically, the detectors are arranged in two or more banks which do not fully surround the subject. Alternatively, the detectors may be arranged in a non-ring-shaped pattern. In these cases, the model given by equation (1) above is no longer appropriate, as the rotation causes the direct inter-relation between detectors and entries in the sinogram bins to break down. Every sinogram bin typically contains counts detected by multiple detector-pairs. For some of these scanners, including the ECAT ART™ PET scanner, the transmission measurement is again performed using a single photon point source. However, the source is transported only axially relative to the (rotating) detector arrays. The ECAT ART scanner contains two such sources, one located on each of the opposing detector banks. The ECAT ART scanner is described in further detail in the article "The ECAT ART Scanner for Positron Emission Tomography: "1. Improvements in Performance Characteristics", David W. Townsend et al., Clinical Positron Imaging, Vol. 2, No. 1, 1999 and the article "Design and Performance of a Single Photon Transmission Measurement for the ECAT ART" C. C. Watson, W. F. Jones, T. Brun, K. Baker, K. Vaigneur and J. Young, IEEE Medical Imaging Conference Record M9-02; 1998.

A phantom scan involves positioning a body, referred to as the phantom, containing a positron-emitting radioactive source material in the scanner. A phantom scan is either an emission or a transmission scan with a 'phantom' in the scanner instead of a patient. Typically, the 'phantom' is an object made out of plexiglass or suchlike and filled with water mixed with a radioactive substance. The phantom has known shape and attenuation characteristics. A phantom emission scan has in the past been used to calculate detector efficiency estimates. A problem with having to conduct a phantom scan is that the phantom must be handled by an operator to place the phantom inside the scanner and to subsequently remove the phantom. It is both inconvenient and time-consuming, since in any event an operator needs to be available to handle the phantom at the start and end of the procedure. It is also potentially hazardous, in terms of lifting the phantom and exposure to radioactivity.

It would be desirable to be able to estimate detector efficiency data in PET scanners of a type which use a single photon source for transmission scans, without the drawbacks of using a phantom scan.

In accordance with one aspect of the present invention there is provided a method of generating detector efficiency data for a positron emission tomography scanner including:

a detector array for generating detection data; and a single photon source, wherein the method comprises:

conducting an acquisition procedure using the single photon source to produce detection data; and processing said detection data using an efficiency estimation algorithm to calculate data representative of the efficiencies of individual detectors in said array.

By enabling the estimation of detector efficiencies from an acquisition using the single photon source, detector efficiencies can be generated without significant inconvenience to an operator. The detector efficiencies may be derived from a blank scan acquisition conducted at the operator's convenience. Furthermore, the regular need for the use of a phantom scan procedure can be avoided.

In a preferred embodiment of the invention, detector efficiency estimates are made using the artificial coincidence counts generated during a blank scan acquisition made using the single photon source. Typically, artificial coincidence counts are the only suitable detection data made available as an output from a scanner of a type such as an ECAT EXACT3D PET scanner. However, detector efficiency data cannot be accurately estimated from artificial coincidence counts using known techniques, because the known measurement models do not apply. The present invention provides a new measurement model and exemplary efficiency estimation algorithms, which can be applied to artificial coincidence counts produced using blank scans.

Further features and advantages of the present invention will become apparent from the following description of preferred embodiments of the present invention, made by way of example only with reference to the accompanying drawings.

DETAILED DESCRIPTION OF PREFERRED EMBODIMENTS

Figure 1:
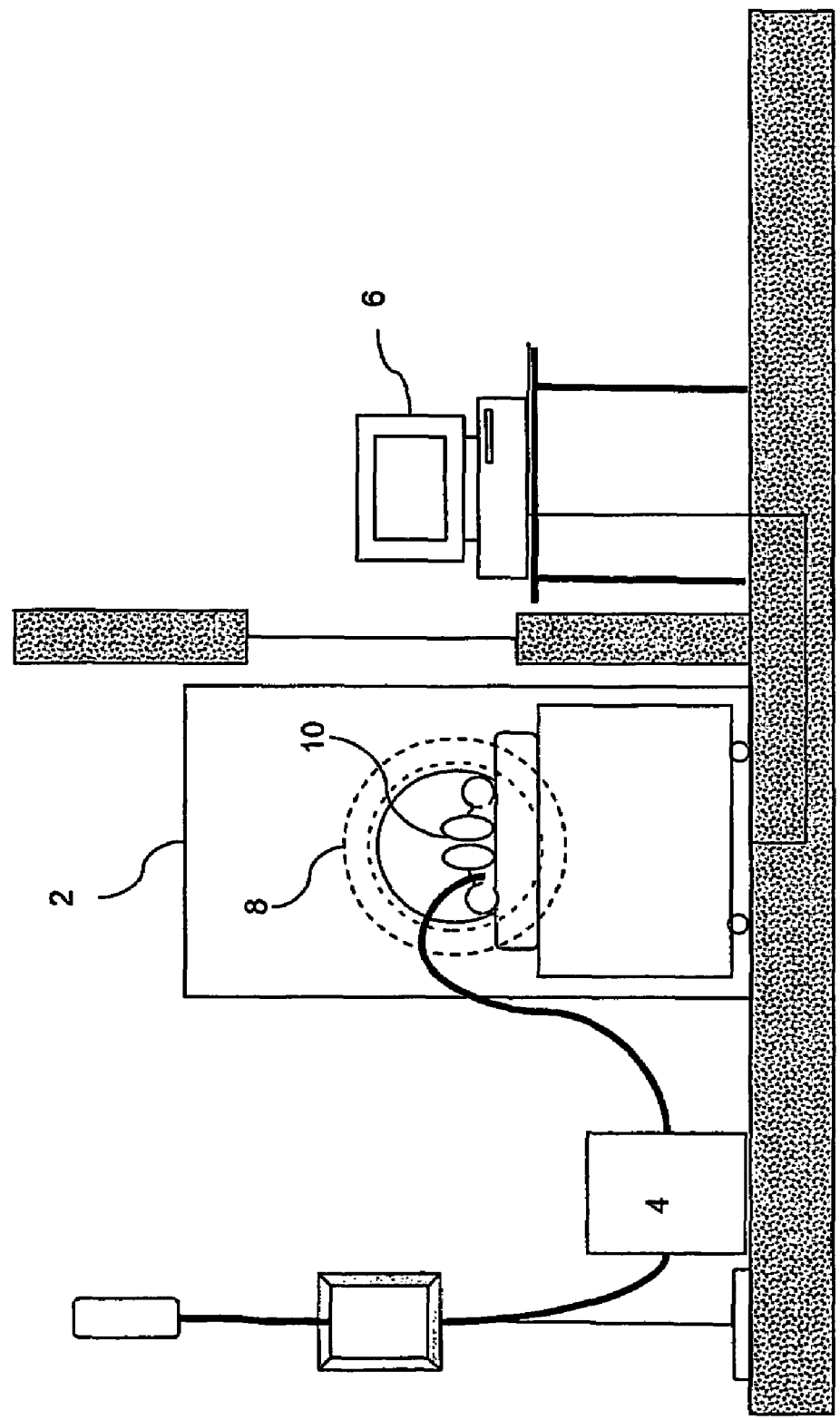
FIG. 1 is a schematic diagram of a PET scanning facility.

Referring now to FIG. 1, a PET scanning facility, arranged in accordance with an embodiment of the invention, is shown, which includes a PET scanner 2, a tracer generator module 4 and an operator computer terminal 6. The scanner 2 includes a detector array 8 arranged about a scanning area, in which a subject 10 is located during a transmission scan and during an emission scan.

Figure 2:
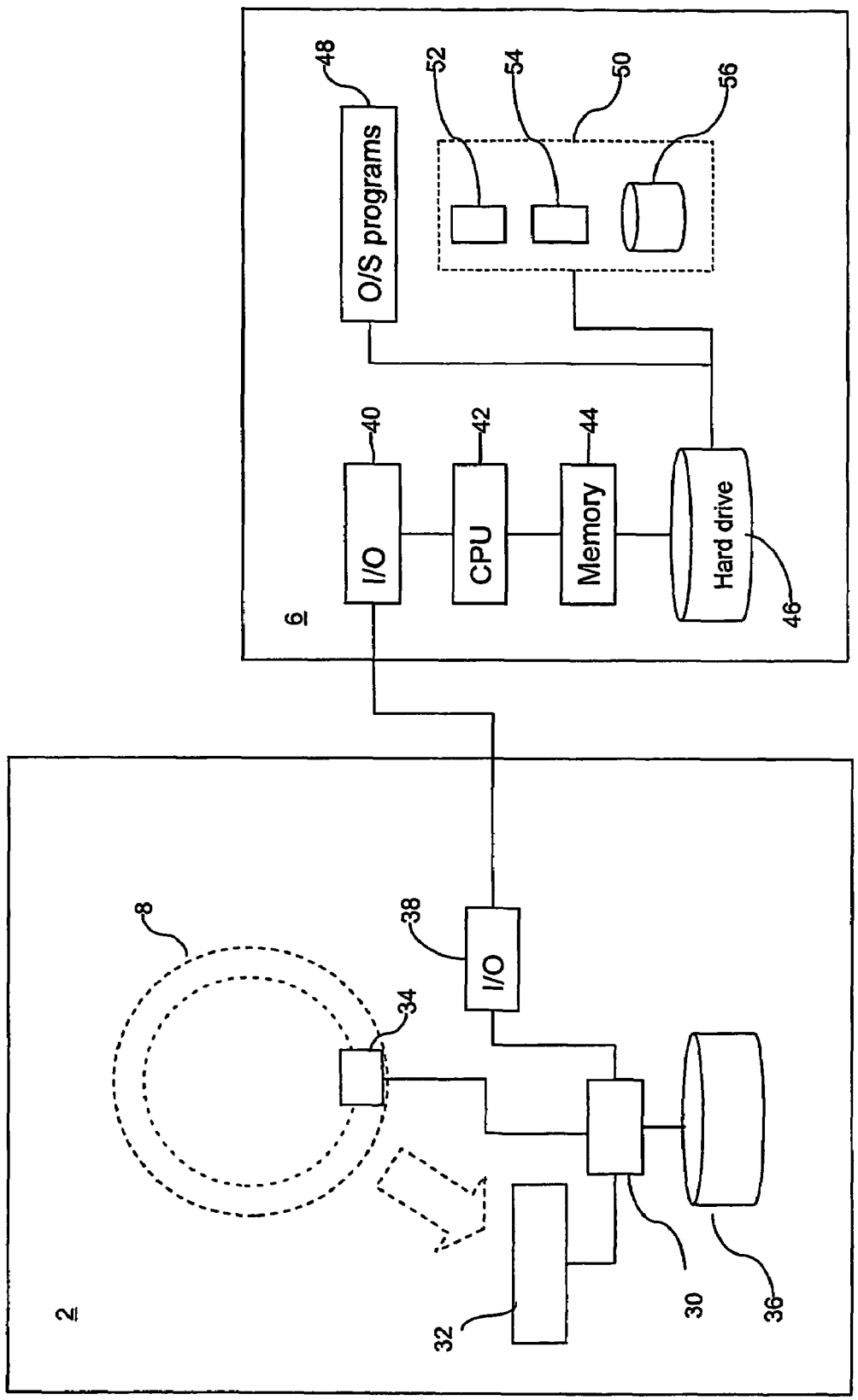
FIG. 2 is a schematic diagram of data processing components in a non-rotating PET scanner and an associated data processing terminal.

As shown in FIG. 2, the PET scanner 2 includes a control unit 30, detection data processing circuitry 32, one or more single photon source position detectors 34, a count store 36 and an Input/Output (I/O) device 38. The computer terminal 6 includes a central processing unit (CPU) 42, memory 44, hard disc drive 46 and I/O device 40, which facilitates interconnection of the computer 6 with the PET scanner 2. Operating system programs 48 are stored on the hard disc drive 46, and control, in a known manner, low level operation of the computer terminal 6. Program files and data 50 are also stored on the hard disc drive 46, and control, in a known manner, outputs to an operator via associated devices. The associated devices include a display, a pointing device and keyboard (not shown), which receive input from, and output information to, the operator via further I/O devices (not shown). Included in the program files 50 stored on the hard drive 46 are a detector efficiency calculating application 52 and a detector efficiency user interface application 54. A database 56 is used to store the detection data transferred from the PET scanner 2.

The detection data processing circuitry 32 of the PET scanner operates in two different modes. In a positron source mode, the detection data processing circuitry 32 processes all events detected in the detector array 8, and by using a coincidence timing window, detects coincidences between the events which are recorded as real coincidence counts $M_{ij}$. These real coincidence counts are then output to sinogram bins in the count data store 36 for subsequent processing.

In a single photon source mode, the detection data processing circuitry 32 generates artificial coincidence counts when a single photon source is exposed in the scanner, as will be described below in further detail. The one or more single photon source position detectors 34 provide a position detection output to control unit 30 which generates a dynamic position estimate during the acquisition, which is sent to the detection data processing circuitry 32. The detection data processing circuitry 32 filters the detector outputs so as to discard all events detected on the side of the detector array nearest the current source position. Next, the detection data processing circuitry 32 generates an artificial coincidence count $M'_{ij}$, and transmits the artificial coincidence count data to sinogram bins in the count data store 36 for subsequent processing.

One implementation of the invention, which is described in further detail below, relates to a non-rotating PET scanner. In the embodiment of this implementation, a PET scanner of the ECAT EXACT3D™ type is used. However, it should be noted that this implementation of the invention applies also to other non-rotating scanners which include a single photon source. In this embodiment, the detectors in the detector array 8 are arranged in square detector blocks, each containing 64 detector elements. The detectors are arranged in six rings of detector blocks. There are 48 detector blocks in each ring. The total number of lines of response (LORs) that can be acquired is thus, in this embodiment, about 190 million.

Figure 3:
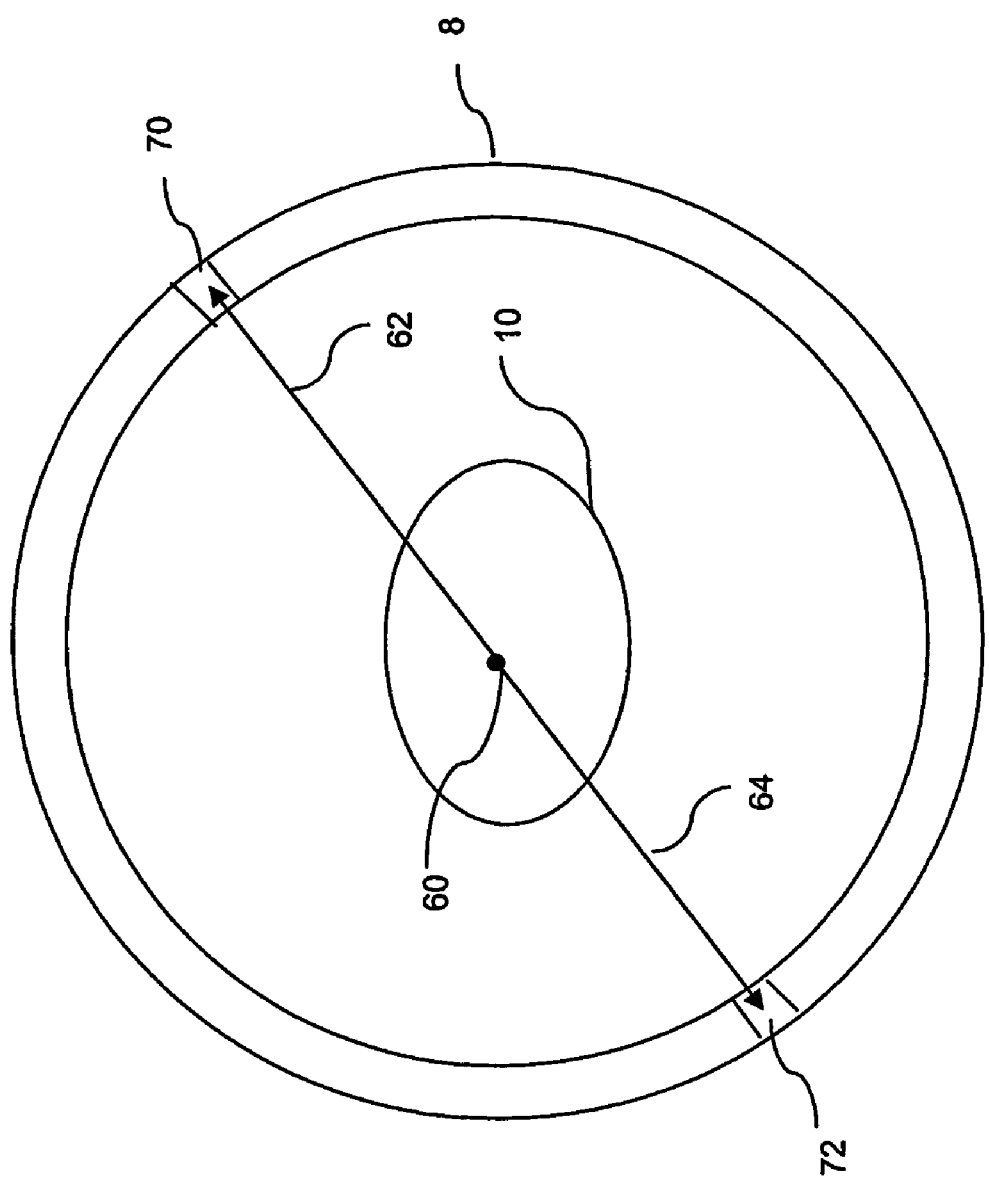
FIG. 3 is a schematic cross section of the arrangement within a non-rotating PET scanner during an emission scan acquisition.

FIG. 3 illustrates features of operation of the non-rotating PET scanner in a positron source mode during an emission scan. During an emission scan, the subject 10 is placed in the scanning area and contains the tracer generated by the tracer generator module 4. FIG. 3 shows a positron emission event being registered in the detector array 8. The positron 60 annihilates and generates a first photon 62 travelling in one direction and a second photon 64 travelling in an opposite direction. The first photon is detected by a detector element 70 on one side of the detector array 8, and the second photon 64 is detected in a different detector element 72 on the other side of the detector array 8. As described above, the detection data processing circuitry 32 registers the two as a coincidence along the LOR defined between the two different detectors 70, 72.

Figure 4:
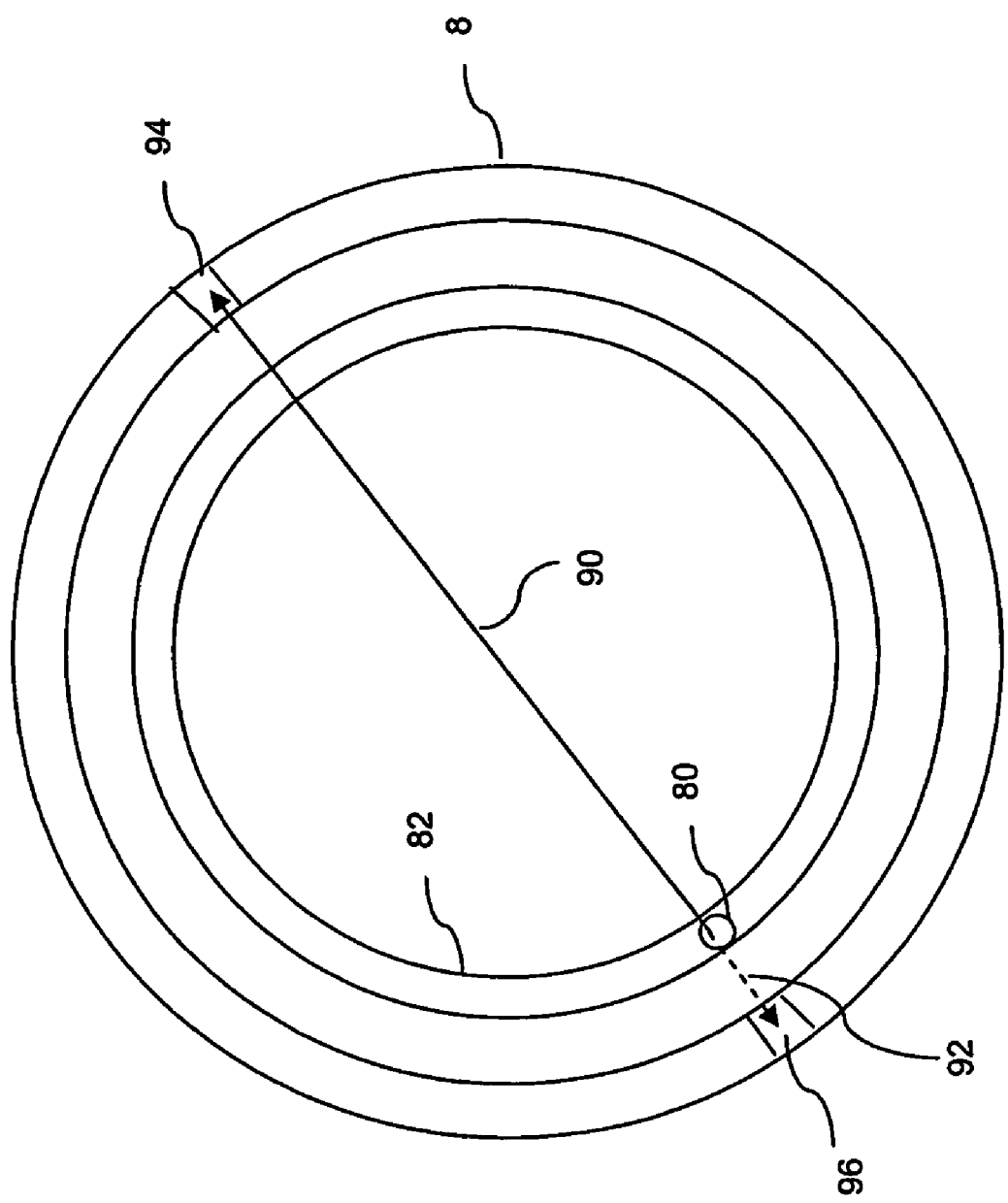
FIG. 4 is a schematic cross section of the arrangement within a non-rotating PET scanner during a blank scan acquisition using a single photon source.

FIG. 4 illustrates features of operation of the non-rotating PET scanner in a single photon source mode during a blank scan. In this mode, a single photon source 80 is transported around the periphery of the scanning area using a single photon source transport mechanism 82. The single photon source 80, referred to as a "point" source due to its small diameter, consisting of a pellet of $^{137}Cs$ is driven in a fluid-filled steel tube wound into a helix and positioned just inside the detector array 8. The tube diameter is 4 mm or smaller and the $^{137}Cs$ point source, with a radioactivity typically between 1 to 10 mCi, has a diameter of 2 mm or less. The source is transported in a liquid carrier and is buoyancy matched to the specific gravity of the liquid. The arrangement is designed to increase consistency of the speed of travel of the source.

There are 48 turns of the helix within the detector field of view, corresponding to one turn per detector ring. The source carrier is driven by a pump (not shown) at a speed of about 1 $ms^{-1}$. The source 80 is shown in FIG. 4 emitting a single photon 90 which is detected at a detector 94 on the opposite side of the detector array 8 to the source 80. FIG. 4 shows a virtual second photon 92, representing the artificial coincidence registered in the detector data processing circuitry 32 as described above. An event along an LOR is registered between the two respective detectors involved, the detector 94 registering the event and the detector 96 immediately adjacent the current source position 80. As described above, the detection data processing circuitry 32 generates an artificial coincidence count which is transmitted to the count data store 36.

After the end of the acquisition, the operator can instruct computer terminal 6 to download the detection data held in count data store 36 to the database 56 on the computer terminal hard drive 46, where the data can be processed.

In accordance with this embodiment of the present invention a measurement model for an acquisition using the single photon source is provided, which takes into account the method whereby the artificial coincidence counts are produced. The measurement model has the form:

$$M'_{ij} = \epsilon_i A'_{ij} + \epsilon_j A'_{ji} \qquad (4)$$

where $M'_{ij}$ are the measured artificial coincidence counts between detectors i and j, $\epsilon_i$ and $\epsilon_j$ are the intrinsic efficiencies of detectors i and j respectively and $A'_{ij}$ are the ideal artificial coincidence counts measured if the detector efficiency of detector i had an ideal performance, while the detection efficiency of detector j was 0. This measurement model takes into account that an event $M'_{ij}$ recorded between detectors i and j will have originated either from detector i or j. These will have each have a respective inherent efficiency $\epsilon_i$ or $\epsilon_j$. For a ring-shaped scanner where the single photon source orbits a spiral with a centre of rotation coinciding with the axis of the PET scanner, it can be assumed that $A'_{ij} = A'_{ji}$.

Thus, the measurement model used is additive, in that the measured artificial coincidence counts $M'_{ij}$ of a particular artificially coincident pair of detectors are equal to a weighted sum of their individual efficiencies. This contrasts with the known model for a true coincidence system, based on equation (2) above, which is multiplicative, in that the measured counts $M_{ij}$ of a particular coincident pair of detectors are proportional to the product of the individual detector efficiencies, which can lead to very significantly different results.

Next, an algorithm is provided for estimating detector efficiencies. Assuming that the transmission scan is reasonably constant over the region of the coincident pairs taken into consideration, then the $A'_{ij}$ terms can be ignored. Equation (4) can then be rearranged and solved as an efficiency estimation algorithm using the following iterative formula:

$$\varepsilon_i^{k+1} = \frac{1}{J}\left(\sum_j M'_{ij} - \sum_j \varepsilon_j^k\right) \qquad (5)$$

$$k = 1, \ldots, N_{iter}$$

where J is the number of detectors in the accepted fan and k is the iteration number. For the first iteration the efficiencies can be initialized to any positive constant. For a fast convergence to a solution, new estimates of $\epsilon_i^{k+1}$ are passed into the right hand side of equation (5) as soon as they have been calculated. If the $A'_{ij}$ terms cannot be ignored, a general iterative linear equation solver may be used. It is possible to use more sophisticated methods, for example based on a Maximum Likelihood prescription which takes noise in the measurements into account. In particular, because of the additive nature of the measurement model (4), the Maximum Likelihood methods applicable to image reconstruction in PET, such as the MLEM algorithm as described in the article "Maximum likelihood reconstruction for emission tomography", Y. Vardi, L. A. Shepp, IEEE Trans. Med. Imag., Vol. 1, pp. 113-121, 1982, may be used. To briefly describe the MLEM algorithm, we introduce some notation as follows. We use the index z to run over all sinograms bins. We define a matrix P to concisely write the linear measurement model as:

$$M_z = \sum_j P_{zj}\varepsilon_j \quad (6)$$

or in matrix notation:

$$M = P\epsilon \quad (7)$$

The MLEM algorithm can then be written as:

$$\epsilon^{k+1} = (\epsilon^k \div Pu) \otimes P^t(M \div P\epsilon^k) \quad (8)$$

where u is a sinogram with all elements equal to 1, ÷ denotes element-wise division and ⊗ denotes element-wise multiplication. The initial estimate for $\epsilon$ is arbitrary, as long as all elements are strictly positive. However, we recommend setting all $\epsilon_j$ to 1. For more details, we make reference to the above mentioned article, the contents of which are incorporated herein by reference.

Whichever efficiency calculating algorithm is selected, the detector efficiency calculating component 52 implements the efficiency calculating algorithm as provided hereby.

A PET scanner can perform a transmission scan in either 2D or 3D mode. For patient scans on the ECAT EXACT 3D, both 3D blank and 3D transmission acquisitions can be conducted. Data from several LORs are then combined together in a process called spanning to save data storage space. This means that the above measurement model (4) is no longer appropriate. To avoid this problem, a blank scan acquisition is preferably conducted in a 2D mode (in which no spanning occurs), and from this individual detector efficiencies can be calculated. However, where it is possible to acquire the blank scan acquisition data in 3D mode without spanning the data, the 3D blank scan data may be used to calculate detector efficiencies in accordance with the invention. Even with 3D blank scan data with spanning, although more complicated, the measurement model is still a linear combination of the detector efficiencies, and hence this system of linear equations can be solved by an iterative procedure similar to equation (5) above. Similarly, a Maximum Likelihood approach such as the MLEM algorithm can be applied.

To experimentally test the efficiency estimate algorithm provided using equation (5) above, a direct plane 1 hour blank scan acquisition was performed on an ECAT EXACT3D scanner. The efficiencies were calculated using equation (5) and a corrective efficiency sinogram generated for each ring. The acquired blank sinogram, generated using the artificial coincidence count data, showed clearly the differing detector efficiencies by diagonal lines of varying intensity. The acquired blank sinogram was corrected for these effects using the calculated efficiency sinogram, and the corrected blank scan sinogram was seen to be free of diagonal lines of varying intensity. Thus, the calculated efficiency estimates were shown to be accurate.

Figure 5:
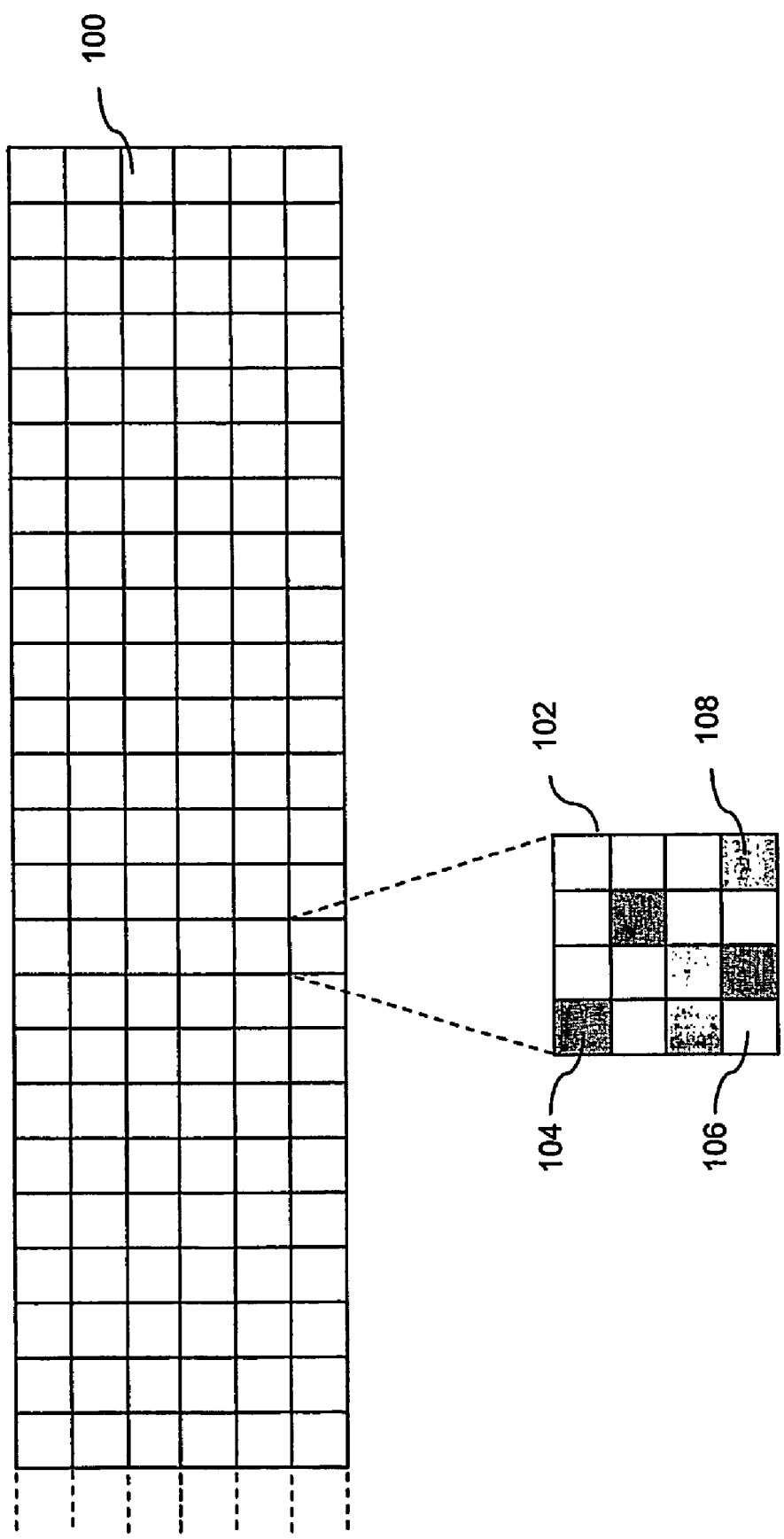
FIG. 5 is an illustration of a user interface provided in an embodiment of the invention for presenting detector efficiency estimates to an operator.

FIG. 5 illustrates a display part of a user interface generated on the computer terminal 6 by the detector efficiency user interface application 54 using the detector efficiency data calculated by data efficiency calculating application 52 after a blank scan procedure as described above. The display includes a detector representation 100, showing each of the detectors in the detector array 8 on a flat grid 100. The flat grid 100 is divided into detector block squares 102, representing each detector within the block as a separate pixel for the different brightness intensity. The brightness intensity used in each pixel represents the calculated efficiency estimate for the respective detector. A relatively dark pixel 104 is used to illustrate a detector having a relatively poor efficiency. A relatively bright pixel 106 is used to illustrate a detector having a good, fully operative efficiency. An intermediate brightness intensity pixel 108 is used to represent a detector having an intermediate efficiency. Thus, by viewing the grid 100, the operator is able to visually identify detectors having poor and intermediate efficiencies, thereby to detect problems in the detector array 8. For example, occasionally an entire detector block will be somehow impaired or even inoperative. In this case, the entire detector block square 102 will appear relatively dark, and the operator can determine that the block requires replacement in order to keep the PET scanner image quality high.

Furthermore, the detector efficiency user interface application 54 is provided with one or more automated block impairment check routines which are used to highlight blocks which are determined to be below a given threshold of acceptable operation. In a first check routine, an average efficiency is taken across each block. If the average detector efficiency within any block is below a preset threshold, the relevant block square 102 is highlighted, for example by the addition of a coloured border or a flashing display of the block square 102.

In a second block check routine, the coefficient of variation of efficiencies within a block is calculated. The detector efficiency user interface application 54 then highlights, for example by the addition of a coloured border or a flashing display, any detector square 102 representing a block having a coefficient of variation which is higher than a preset threshold.

Other implementations of the invention, which are described in further detail below, relate to a rotating PET scanner. In an embodiment of this implementation, a scanner of the ECAT ART™ type is used. However, it should be noted that this implementation of the invention applies also to other rotating scanners which include a single photon source. In this particular embodiment, the detectors in the detector array are arranged in square detector blocks, each containing 64 detector elements. The detectors are arranged in two banks of detector blocks. The banks do not entirely surround the scanning area, thus allowing fewer detector elements to be used in the scanner.

Figure 6:
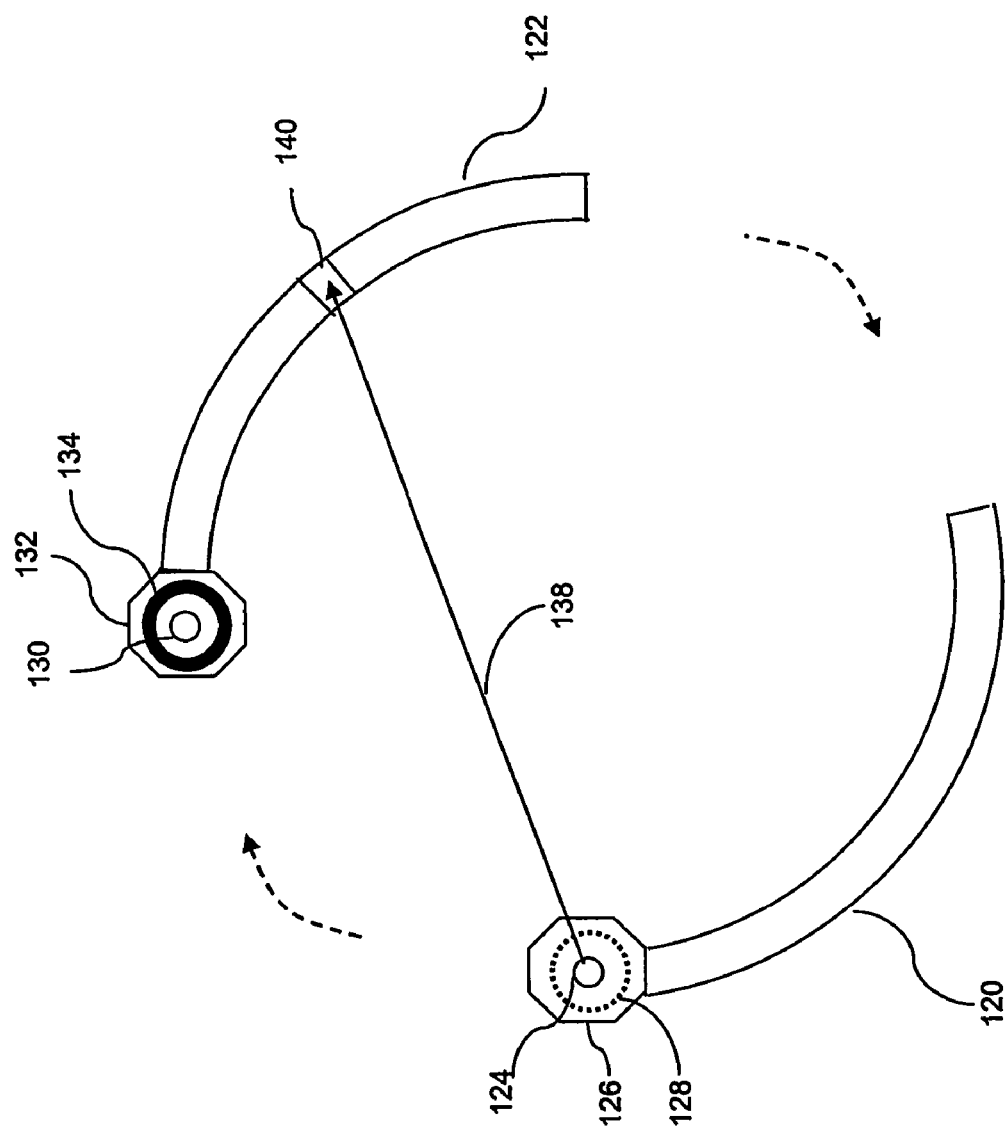
FIG. 6 is a schematic cross section of the arrangement within a rotating PET scanner during a blank scan acquisition using a single photon source.

FIG. 6 illustrates features of operation of the rotating PET scanner in a single photon source mode during a blank scan. The scanner has first and second detector banks 120, 122 arranged on different sides of the patient. The two detector banks are arranged on a rotating mechanism which allows the banks to rotate about the scanning area. For blank scans, a single photon source 124, 130 is held in a single photon source transport mechanism 126, 132 on one side of each of the respective detector banks 120, 122. The single photon sources 124, 130 are thus mounted to, and rotate with, the detector array. Each single photon source transport mechanism is arranged to transport the source axially of the rotating detector array during a blank scan. A single photon source shield 128, 134 is provided for each single photon source. During a blank scan, one or each of the single photon source shields 128, 134 may be retracted to expose the single photon source in the interior of the scanner. FIG. 6 shows an arrangement in which the first single photon source 124, on the first detector bank 120, is exposed by the retraction of the first single photon source shield 128, and in which the second single photon source 130, on the second detector bank 122, is exposed by the retraction of the second single photon source shield 130. In this arrangement, a photon 138 emitted by the first single photon source 124 is detected at a detector element 140 on the second detector bank 122.

For a rotating scanner, a count in a given sinogram bin corresponding to a single LOR, may correspond to different detector pairs, because when the detector array is rotating, the LOR between two detectors at time 0 would later be covered by another detector pair.

In one embodiment of the invention, detector efficiency estimates are obtained by conducting a blank scan acquisition when the rotatable detector array is held stationery. In the case that no LORs are combined (i.e. no spanning), there is a one-to-many correspondence between the (non-zero) bins in the sinogram and the detectors. In this case, the measurement model is:

$$M'_z = \epsilon_{j_z} A'_z \quad (9)$$

where there is a one-to-many correspondence between $j_z$ and $z$, and efficiencies can be solved by using:

$$\epsilon_j = (\Sigma_{z \in Z_j} M'_z)/(\Sigma_{z \in Z_j} A'_z) \quad (10)$$

where the set $Z_j$ contains all sinogram bins that correspond to the detector $j$, i.e.

$$Z_j = \{z | j_z = j\} \quad (11)$$

Equation (10) is the Maximum Likelihood solution for the efficiencies when the measurement model (9) applies. The sum in (10) over all sinogram bins that correspond to the same detector reduces the noise in the estimated efficiencies.

In further embodiments of implementation of the invention for rotating scanners, detector efficiency estimates are generated when the detector array is rotating. The detector efficiencies may depend on temperature, and hence rotation speed, thus detector efficiency estimates may be generated which more accurately reflect the operative efficiencies.

In one embodiment in which the detector array is rotated during a blank scan acquisition, one single photon source is exposed to the (rotating) detector array, and the other single photon source is shielded, as shown in FIG. 6. In this case, a measurement model that can be used has the same form as equation (9) above, albeit with different $A'_z$ values, where there again is a one-to-many correspondence between $j_z$ and $z$. Hence a prescription similar to (10) can also be used. The measurement is then to be repeated with the other source viewable such that the other detector bank is irradiated.

In a further embodiment in which the detector array is rotated during a blank scan acquisition, both single photon sources are exposed in the (rotating) detector array. In this embodiment, at least some of the sinogram bin values will correspond to either two or four overlapping but different source-detector arrangements. A possible solution to this problem is to use gating hardware. Gating hardware provides multiple sinograms (one for each gate), where counts are assigned to a gate according to the time they are detected. The overlap effect occurs at the periphery of the detector banks. There is an angle, $\delta$, which defines the smallest rotation angle before overlap occurs. Taking the largest angle $\delta' \leq \delta$ such that $360°$ is an integer multiple of $\delta'$, i.e. $360° = \delta' * N$, where N is an integer, N gates are set up, each of length T/N where T is the period of rotation of the scanner. After a full rotation, the scanner hardware will add counts to the same set of gates again, such that N different sinograms, each with uniquely identifiable correspondence between the LOR and detector, are produced. A measurement model, and analysis function, such as that described above using a single exposed source may then be employed to generated detector efficiencies.

Finally, also for the case of rotating scanners, spanning is often introduced to reduce storage demands. As for non-rotating scanners, this will mean that the measurement model (9) is to be modified such that the measured artificial counts are a linear combination of efficiencies. As before, one can solve for the efficiencies with a Maximum Likelihood algorithm such as the MLEM algorithm.

Thus, it will be appreciated that the present invention may be implemented to generate detector efficiencies from a blank scan that could then be used as a daily check on the performance of a PET scanner. The invention may also be used to provide detector efficiency factors for a scanner normalisation procedure. Since detector efficiencies change over time, it is desirable to be able to ascertain detector efficiency factors on a regular basis and without the need for complex procedures. The above-mentioned efficiency estimation algorithms, or alternatives thereto, may be used in such a procedure.

The above embodiments are to be understood as illustrative examples of the invention. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A method of generating detector efficiency data for a positron emission tomography scanner including:
   a detector array for generating detection data; and
   a single photon source,
   a coincidence detection system for producing coincidence count data ($M_{ij}$) in the detection data during an acquisition when a positron source is inside the scanner, and wherein the scanner is arranged to produce artificial coincidence count data ($M'_{ij}$) during an acquisition using the single photon source;
   wherein the method comprises the steps of:
   conducting an acquisition procedure using the single photon source to produce detection data;
   generating artificial coincidence count data taking the position of the single photon source into account; and
   processing said detection data using an efficiency estimation algorithm to calculate data representative of the efficiencies of individual detectors in said array by processing said artificial coincidence count data, wherein the efficiency estimation algorithm is based upon a measurement model which is additive, in that the measured model is related to a weighted sum of individual efficiencies.

2. A method according to claim 1, wherein said conducting step farther comprises conducting a blank scan acquisition.

3. A method according to claim 1, wherein the scanner is a non-rotating scanner.

4. A method according to claim 1, wherein the scanner is a rotating scanner.

5. A method according to claim 4, wherein the scanner comprises two single photon sources and the method further comprises the step of selectively operating one of the two single photon sources during the step of conducting the acquisition.

6. A method according to claim 1, wherein said processing step further comprises the step of generating an output on an output device for an operator.

7. A method according to claim 1, wherein said processing step further comprises processing said data representative of efficiencies to identify detector elements, or groups of detector elements having relatively low efficiencies.

8. A method according to claim 7, further comprising the step of processing said data representative of efficiencies using a function determining a parameter relating to an average over a plurality of detector elements.

9. A method according to claim 7, further comprising the step of processing said data representative of efficiencies using a function determining a parameter relating to an amount of variation therein.

10. Computer software for generating detector efficiency data for a positron emission tomography scanner including:
a detector array for generating detection data; and
a single photon source,
wherein the scanner includes a coincidence detection system for producing coincidence count data ($M_{ij}$) in the detection data during an acquisition when a positron emitting source is inside the scanner, and wherein the scanner is arranged to produce artificial coincidence count data ($M'_{ij}$) during an acquisition using the position of the single photon source;
wherein the software is adapted to operate on detection data generated by conducting an acquisition procedure using the single photon source, and wherein the software is adapted to operate on said artificial coincidence count data, and
wherein the software is adapted to process said detection data using an efficiency estimation algorithm to calculate data representative of the efficiencies of individual detectors in said array, wherein the efficiency estimation algorithm is based upon a measurement model which is additive, in that the measurement model is related to a sum of their individual efficiencies.

11. Computer software according to claim 10, wherein said acquisition procedure includes a blank scan acquisition.

12. Computer software according to claim 10, wherein the scanner is a non-rotating scanner.

13. Computer software according to claim 10, wherein the scanner is a rotating scanner.

14. Computer software according to claim 13, wherein the scanner comprises two single photon sources and the software is adapted to selectively operate one of the two single photon sources during the acquisition procedure.

15. Computer software according to claim 10, wherein the software is adapted to generate an output, responsive to said data representative of efficiencies, on an output device for an operator.

16. Computer software according to claim 10, wherein the software is adapted to process said data representative of efficiencies to identify detector elements, or groups of detector elements having relatively low efficiencies.

17. Computer software according to claim 16, wherein the software is adapted to process said data representative of efficiencies using a function determining a parameter relating to an average over a plurality of detector elements.

18. Computer software according to claim 16, wherein the software is adapted to process said data representative of efficiencies using a function determining a parameter relating to an amount of variation therein.

19. A data carrier comprising computer software according to claim 10.

* * * * *